US012766991B2

(12) United States Patent
Darade et al.

(10) Patent No.: US 12,766,991 B2
(45) Date of Patent: Oct. 20, 2026

(54) PHASE BALANCED LOAD MANAGEMENT AT A CHARGING SITE

(71) Applicant: Rivian IP Holdings, LLC, Plymouth, MI (US)

(72) Inventors: Nilesh Darade, Milpitas, CA (US); Chakravarthy Kalyana Allamsetty, San Jose, CA (US); Sergey Istomin, San Jose, CA (US); Cecilia An Zhou, San Francisco, CA (US); Preetinder Singh Dhaliwal, Dublin, CA (US); Jason Philip Kurs, Sunnyvale, CA (US); Alex Cheng-Chi Yang, Redwood City, CA (US); Christopher Galen Werring, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 768 days.

(21) Appl. No.: 18/183,471

(22) Filed: Mar. 14, 2023

(65) Prior Publication Data

US 2024/0308378 A1 Sep. 19, 2024

(51) Int. Cl.

| | |
|---|---|
| ***H02J 7/00*** | (2026.01) |
| ***B60L 53/16*** | (2019.01) |
| ***B60L 53/30*** | (2019.01) |
| ***B60L 53/63*** | (2019.01) |
| ***B60L 53/65*** | (2019.01) |
| ***H02J 7/14*** | (2006.01) |

(52) U.S. Cl.

CPC ............... *B60L 53/63* (2019.02); *B60L 53/16* (2019.02); *B60L 53/305* (2019.02); *B60L 53/65* (2019.02)

(58) Field of Classification Search

CPC .......... B60L 53/16; B60L 53/63; B60L 53/65; B60L 53/305

USPC .......................................................... 320/132

See application file for complete search history.

(56) References Cited

U.S. PATENT DOCUMENTS

| | | | | |
|---|---|---|---|---|
| 11,890,960 | B1 * | 2/2024 | Bhati | B60L 53/63 |
| 2009/0115357 | A1 * | 5/2009 | Engel | B60M 3/04 318/434 |
| 2009/0160247 | A1 * | 6/2009 | Nakamura | B60K 6/365 307/9.1 |

(Continued)

OTHER PUBLICATIONS

Notice of Allowance on U.S. Appl. No. 18/183,193 dated Nov. 2, 2023.

(Continued)

*Primary Examiner* — Alexis B Pacheco

(74) *Attorney, Agent, or Firm* — Foley & Lardner LLP

(57) ABSTRACT

Load management of chargers at a charging site is provided in which one or more processors coupled with memory can identify a setting for a first charger and a second charger that can be coupled with a phase line of an electrical panel to conduct power at a first phase. The one or more processors can determine that the phase line is configured to operate below a phase line capacity of the phase line while the first charger coupled with the phase line operates at a charger capacity of the first charger. The one or more processors can cause the first charger to operate at the charger capacity according to the setting in response to determining that the phase line is configured to operate below the phase line capacity while the first charger coupled with the phase line operates at the charger capacity.

20 Claims, 5 Drawing Sheets

(56) References Cited

U.S. PATENT DOCUMENTS

| | | | | |
|---|---|---|---|---|
| 2012/0055751 | A1* | 3/2012 | Vollenwyder | B60L 5/005<br>191/10 |
| 2012/0326498 | A1* | 12/2012 | Woronowicz | B60L 5/005<br>307/9.1 |
| 2013/0112519 | A1* | 5/2013 | Anders | B60M 1/34<br>191/10 |
| 2016/0137087 | A1* | 5/2016 | Haas | H02J 13/00017<br>320/109 |
| 2018/0157231 | A1* | 6/2018 | Bogdan | H02J 13/00017 |
| 2019/0052171 | A1* | 2/2019 | Kitamoto | B60L 58/40 |
| 2019/0359077 | A1* | 11/2019 | Beez | H02J 3/26 |
| 2020/0122585 | A1* | 4/2020 | Bhat | G05B 19/0426 |
| 2021/0083506 | A1 | 3/2021 | Rao et al. | |
| 2022/0216728 | A1* | 7/2022 | Ashman | H02J 3/14 |
| 2022/0258637 | A1* | 8/2022 | Chow | B60L 53/11 |
| 2022/0360194 | A1* | 11/2022 | Kuder | H02M 1/007 |
| 2022/0396168 | A1* | 12/2022 | Jefferies | B60L 50/60 |
| 2023/0120740 | A1 | 4/2023 | Lewchuk et al. | |

OTHER PUBLICATIONS

Non-Final Office Action on U.S. Appl. No. 18/183,193, dated May 11, 2023, 18 pgs.

* cited by examiner

PHASE BALANCED LOAD MANAGEMENT AT A CHARGING SITE

INTRODUCTION

Charging sites can include a chargers for charging the batteries of electric vehicles (EVs). A charging site can include multiple chargers to accommodate multiple vehicles simultaneously.

SUMMARY

The present disclosure is directed to phase balanced load management of EV chargers whose combined power capacity exceeds the capacity the electrical panel to which these chargers are electrically coupled. When multiple chargers connected to a phase line of an electrical panel have a combined power capacity exceeding the capacity of the phase line on the electrical panel, simultaneous operation of these chargers can cause a circuit breaker at the panel to trip. To avoid tripping the breakers, the site can be configured to either include a limited number of chargers whose combined operation will not exceed the panel capacity or the chargers at the site can have its individual power levels limited so as to ensure that their simultaneous operations does not exceed the power capacity. However, either of these configurations can prevent the chargers at the site to provide power to the EVs at the full capacity, thereby prolonging the process of EV charging and adversely impacting the user experience.

The present solution addresses these issues by, for example, providing a configuration that allows multiple EV chargers connected to the same phase lines to operate at increased (e.g., their maximum capacity) power levels, provided that the combined power throughput of the chargers at the time does not exceed the capacity of the phase line at the electrical panel. In doing so, the present solution allows the electrical panel to support on a limited number of phase lines a large number of EV chargers whose combined maximum capacity can exceed the power capacity of the phase lines, without limiting the operational level of the chargers or tripping the circuit breaker, thereby shortening the process of EV charging and improving user experience without limiting the number of EV chargers at a site.

An aspect can be directed to a system. The system can include one or more processors coupled with memory. The one or more processors can identify a setting for a first charger and for a second charger. The first charger and the second charger can be coupled with a phase line of an electrical panel to conduct power at a first phase. The one or more processors can determine that the phase line is configured to operate below a phase line capacity of the phase line while the first charger coupled with the phase line operates at a charger capacity of the first charger. The one or more processors can cause the first charger to operate at the charger capacity according to the setting in response to determining that the phase line is configured to operate below the phase line capacity while the first charger coupled with the phase line operates at the charger capacity.

An aspect can be directed to a method. The method can include one or more processors coupled with memory identifying a setting for a first charger and for a second charger. The first charger and the second charger can be coupled with a phase line of an electrical panel to conduct power at a first phase. The one or more processors can include determining that the phase line is configured to operate below a phase line capacity of the phase line while the first charger coupled with the phase line operates at a charger capacity of the first charger. The one or more processor can include causing the first charger to operate at the charger capacity according to the setting in response to determining that the phase line is configured to operate below the phase line capacity while the first charger coupled with the phase line operates at the charger capacity.

An aspect of the present disclosure can be directed to a non-transitory computer-readable media having processor readable instructions. The instructions can be such that, when executed, cause a processor to identify a setting for a first charger and for a second charger. The first charger and the second charger can be coupled with a phase line of an electrical panel to conduct power at a first phase. The instructions can cause the processor to determine that the phase line is configured to operate below a phase line capacity of the phase line while the first charger coupled with the phase line operates at a charger capacity of the first charger. The instructions can cause the processor to cause the first charger to operate at the charger capacity according to the setting in response to determining that the phase line is configured to operate below the phase line capacity while the first charger coupled with the phase line operates at the charger capacity.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of configuring chargers or panels at a charging site. The various concepts introduced above and discussed in greater detail below may be implemented in any of numerous ways.

The present disclosure is directed to load balancing of EV chargers whose combined power capacity exceeds the power capacity of the phase line of the electrical panel to which the chargers are electrically coupled. The solution is based on phase level connection of the chargers and utilizes a policy setting to operate each of the chargers at a maximum power capacity when the capacity of the phase line connected to the charger is not exceeded. Electrical panels at a charging site can have a limited power capacity, which in turn can constrain the number of chargers that can be connected to the phase(s) of the electrical panel. When a number of chargers connected to a phase line of a panel have a collective power capacity exceeding that of the phase line, simultaneous operation of such chargers can trip a phase line circuit breaker at the panel. To avoid tripping the breakers, charging sites can either include only a limited number of chargers connected to the panel or chargers can have their individual power levels limited so as to ensure that simultaneous operations do not trip the breaker.

While setting power limits to individual EV chargers can potentially prevent the chargers from tripping phase line breakers, doing so can reduce the ability of chargers to provide power at their highest energy capability, resulting in diminished user experience. Likewise, limiting a number of chargers at the site to a number sufficiently small to preclude tripping of the breakers can also result in an insufficient number of chargers deployed a site, underserving the users during high demand periods. The present solution addresses these issues by allowing multiple chargers connected to the same phase lines to operate at increased (e.g., a maximum) power levels, so long as the total power throughput of the chargers does not exceed the phase line capacity. The present solution thus allows an electrical panel to support on each of its phase lines a number of EV chargers whose combined throughput capacity exceeds the power capacity of the phase lines, without limiting the operational level of the chargers, allowing their individual full capacity operation when the phase line capacity is not exceeded.

Figure 1:
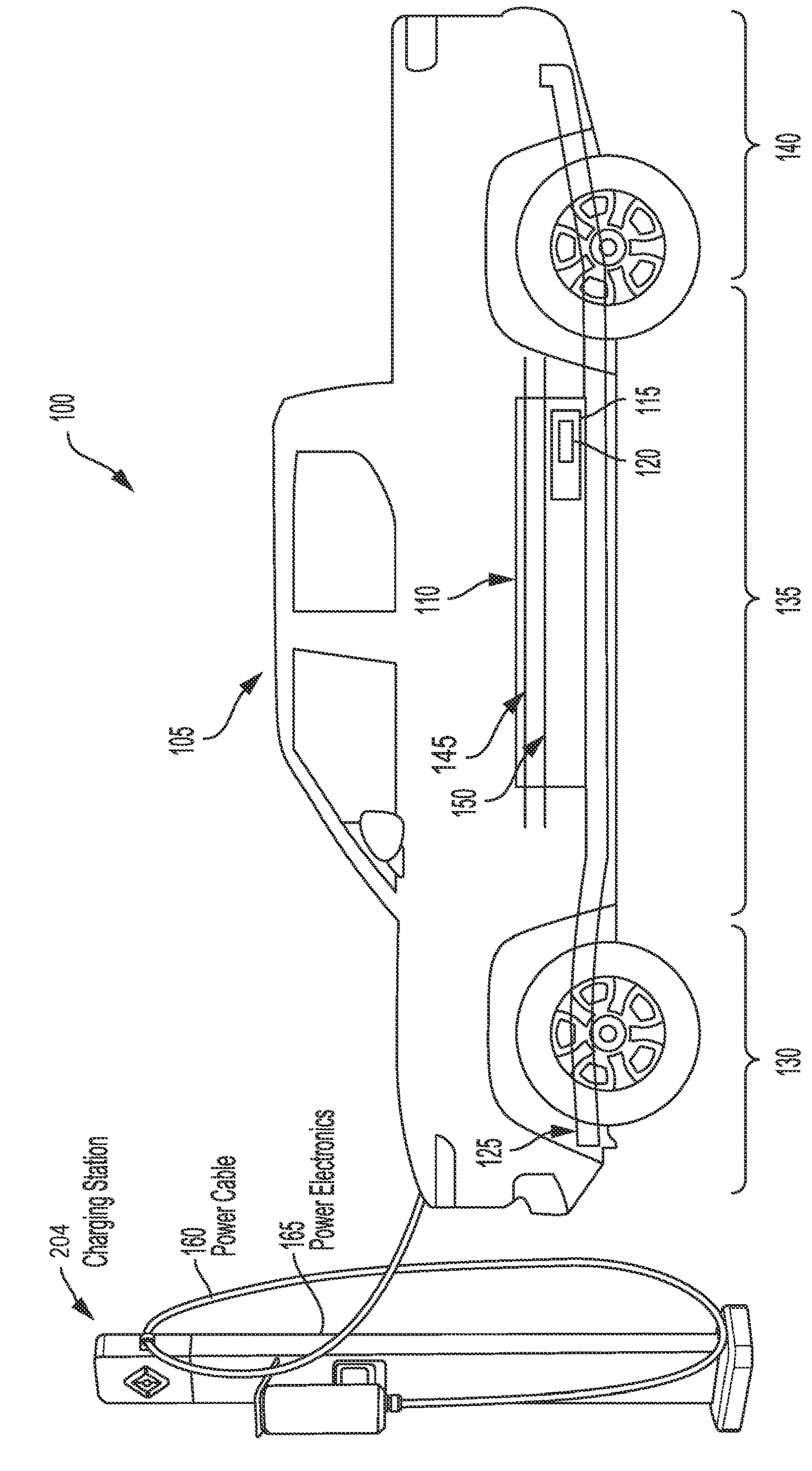
FIG. 1 depicts an example electric vehicle connected to a charging station.

FIG. 1 depicts an example cross-sectional view 100 of an electric vehicle 105 installed with at least one battery pack 110 and parked next to a charger 204. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Charger 204, also referred to as the charging station 204 or CS 204, can include power electronics 165 which can include any component, part, subsystem or system of the CS 204 used to provide charging or discharging services to EVs 105. Power electronics 165 can include circuits, components or parts providing power to EVs 105 or receiving power from EVs 105. Power electronics 165 can include one or more control boxes, including power circuitry, control electronics, controllers and circuits for managing power or communication between a CS 204 and an EV 105 via a power cable 160. Power electronics 165 can include any analog and digital circuitry, including for example, AC-DC converters, DC-DC converters, DC-AC converters, any combination of power transistors, capacitors, inductors, resistors, diodes, switches, transformers, relays and other electrical or electronic components to form structures, such as half and full bridge circuits, rectifiers, filters, multi-function circuits, single or multi-stage chargers with resonant half-bridge converts utilizing one or more inductors and one or more capacitors, such as the LLC converters and single or multi-directional DC-DC converters. Power electronics 165 can be controller or managed by processors, such as processors 510. Power electronics 165 can include or be connected to memory, such as 615, 620 or 625, which can store scripts, computer code or instructions to be accessed or executed by electronic microcontrollers or devices, such as processors 510. Power electronics 165 can include one or more energy storage systems, including batteries for storing energy, as well as circuitry for interfacing with the electrical grid (e.g., via the panel 210).

Power cable 160, also referred to as the power cord 160, can be attached to or coupled with power electronics 165 of a charger 204. Power cable 160 can include one or more electrical conductor wires or lines, including lines or wires for high power throughput as well as electronic or electrical signals. Power cable 160 can include or be connected to a power plug for plugging into an EV 105 and can include wires or lines for conducting high power, high voltage or high current between EV 105 and CS 204. Power cable 160 can include one or more wires or lines for conducting analog or digital communication signals between the EV 105 and CS 204. Power cable 160 can facilitate or provide a conduit or path for exchange of communication between EV 105 and a charger 204 and for exchange of power (e.g., electricity) between EV 105 and the charger.

Figure 2:
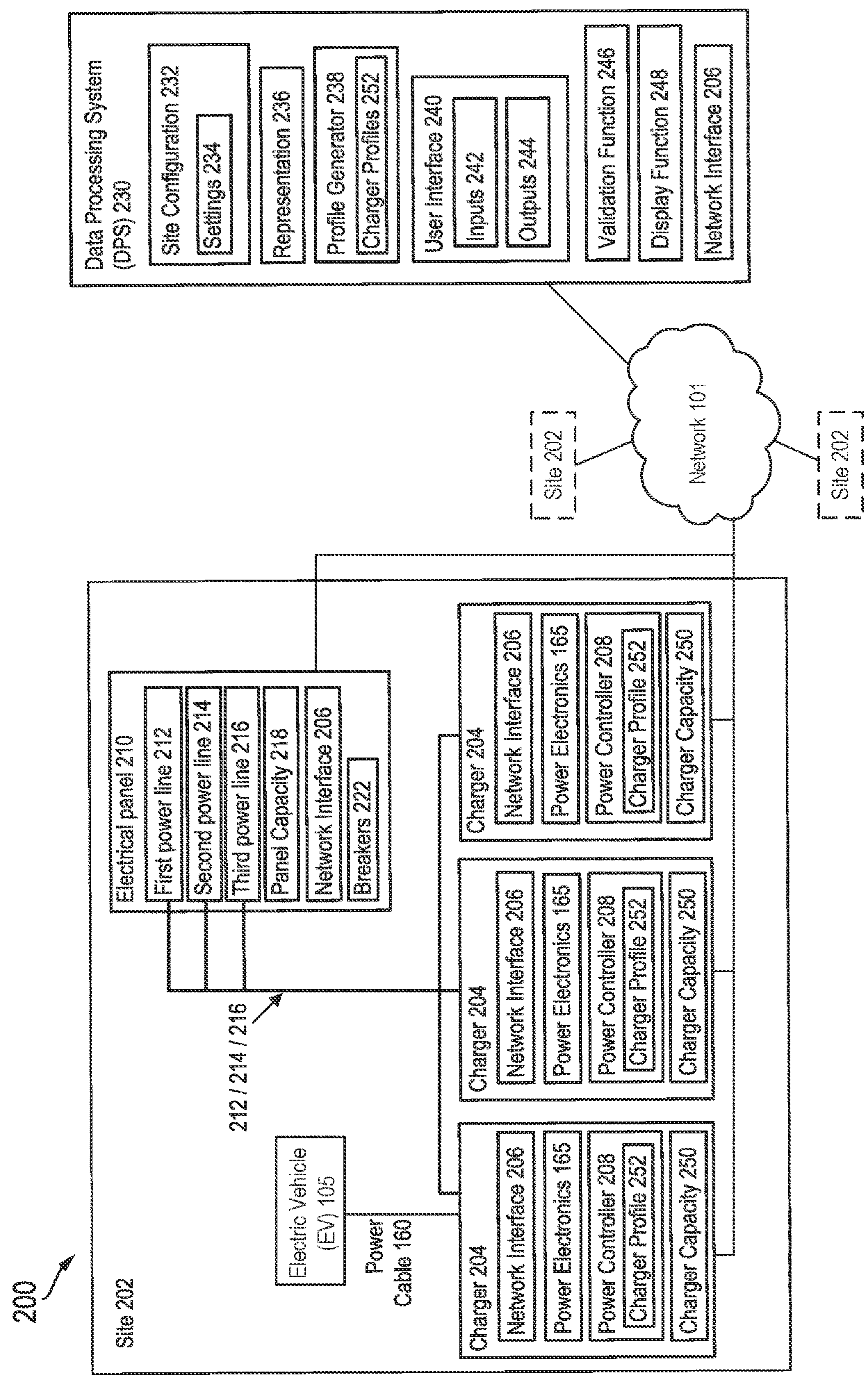
FIG. 2 depicts a block diagram of a system for phase based load management of chargers connected to an electrical panel at an EV charging site.

FIG. 2 depicts an example system 200 for load management of chargers (e.g., EV chargers) at a charging site. FIG. 2 depicts one or more charging sites 202, where each site 202 can include a plurality of plurality of chargers 204 and one or more panels 210. Each charger 204 can be electrically coupled (e.g., connected for directional or bidirectional power exchange) with one or more EVs 105 via power cables 160. Each charger 204 can include a network interface 206, power electronics 165, a charger capacity 250 and a power controller 208 having a charger profile 252 of that charger 204. Each panel 210 can include multiple power lines, such as a first power line 212, a second power line 214 and a third power line 216. Panel 210 can also include one or more panel capacities 218, network interfaces 206 and breakers 222. The panel 210 and the chargers 204 can each be communicatively coupled with a data processing system (DPS) 230 via a network 101. A DPS 230 can include one or more site configurations 232, representations 236, profile generators 238, user interfaces 240, validation functions 246, display functions 248, and network interfaces 206. Each site configuration 232 can include one or more settings 234. Each profile generator 238 can include one or more charger profiles 252. Each user interface 240 can include inputs 242 and outputs 244. The system 200 can be directed to a solution in which a cloud or network based configuration 232, established or generated using a DPS 230, can provide power distribution or load balancing to chargers 204 at an EV charging site 202 based on user selected settings 234, based on which charger profiles 252 can be generated. The configuration 232 that can allow chargers 204 to operate in accordance with their charger profiles 252. The charger profiles 252 can configure the chargers 204 to operate at their individual maximum charger capacities 250 (or at offsets from the charger capacities 250) provided that the panel capacity 218 is not exceeded by the chargers 204 operating simultaneously.

A site 202 can include any location in which chargers 204 and/or panel 210 are disposed, deployed or located. Site 202 can include an EV charging site having any number of chargers 204 for EV 105 users. Site 202 can include any number of chargers 204 connected to a panel 210. For example, site 202 can include a location with chargers 204 having charger capacities 250, which when combined (e.g., added), can exceed the panel capacity 218 of the panel 210. As such, site 202 can include chargers 204 which may not be able to operate simultaneously at their charger capacities 250, given the panel capacity 218 limitation.

Charger 204, also referred to as the charging station 204, or a CS 204, can include any combination of hardware and software for providing electricity or otherwise electrically charging or discharging one or more batteries of one or more EVs 105. CS 204 can be a bidirectional charging station that can include any combination of hardware and software for providing power to or drawing power from one or more batteries of the EV 105, such as the battery packs 110, battery modules 115 or battery cells 120. CS 204 can include scripts, functions and computer code stored in memory and executed or operating on one or more processors to implement any functionality of the CS 204. For example, CS 204 can include a computer system 500 having one or more processors 510 and memories 515, 520 and 525, each of which can store computer code, scripts, functions and instructions to implement functionality of CS 204.

Charger 204 can be a single phase charger or a three phase charger. For example, charger 204 can be electrically coupled to one of the power lines 212, 214 or 216 and ground of the panel 210. For example, charger 204 can be electrically coupled with three power lines 212, 214 and 216 and the ground line of the panel 210. Charger 204 can include electrical and power circuitry, control logic or circuits, power electronics, power supply circuitry, energy storage devices, such as batteries, and other hardware for storing, controlling, modulating or otherwise managing power, energy or electricity provided to, or drawn from, EVs 105. CS 204 can include electric vehicle charging equipment that can include a power and control box and power cord or a cable 160. CS 204 can include circuitry for converting alternating current (AC) to direct current (DC), such as an AC-DC converter. CS 204 can include DC-AC converters or DC-DC converters.

Charger 204 can be configured to couple with one or more EVs 105 at the same time. A charger 204 can be electrically coupled with multiple power lines 212, 214 and/or 216 and can have multiple power cables 160 to couple with multiple EVs 105. For example, a charger 204 can be connected to two power lines (e.g., 212 or 214) of an EV 105 and also be connected to a common or a ground of the panel 210. Charger 204 can then provide charging to a first EV 105 via a first of the power lines (e.g., 212 or 214) and a ground while also providing charging to a second EV 105 via a second one of the power lines (e.g., remaining one of the 212 or 214) and/or the ground.

Charger 204 can be electrically coupled to an electrical grid via a panel 210 and can draw electricity from the grid, via the panel 210, in order to charge EVs 105 or receive electricity from the EV batteries (e.g., 110, 115 or 120). Multiple chargers 204 can be electrically coupled with the same one or more phases of the panel 210, such as the first power line 212 operating at a first phase, a second power line 214 operating at a second phase and/or a third power line 216 operating at a third phase 316. Charger 204 can be set to operate, such as provide or draw electricity, at any maximum charger capacity 250, which can correspond to the maximum operating voltage, current or power levels, such as for example levels rated for chargers that are rated level-1, level-2 or level-3. For example, CS 204 can provide electricity to EVs 105 or draw power from EVs 105 at a maximum operating charger capacity 250 at any voltage level, such as 220V, 208-240V or 400-900V. Similarly, CS 204 can provide electricity to EVs 105 or draw electricity from EVs 105 in accordance with any chargers capacity 250. For example, charger 204 can operate at charger capacities 250 corresponding to level 1, level 2 or level 3 chargers, which can cover or correspond to any power output levels between about 5 kW and 800 kW, such as for example: 5 kW, 10 kW, 20 kW, 30 kW, 50 kW, 80 kW, 100 kW, 150 kW, 120, 650 kW, 700 kW, 350 kW, 700 kW, 700 kW, 800 kW or more.

For example, a level 1 charger 204 can be configured to provide services at level 1 charger capacity 250, which can correspond to about 110-120V, about 1.3 kW to 2.4 kW, and/or about 10 A to 20 A of current range. For example, a charger 204 can have the charger capacity set in accordance with a level 2 rated charger 204, operating at around 208V-240V, about 3 kW to 19 kW range, and about 12 A to 90 A of current range. For example, a charger 204 can have the charger capacity 250 set in accordance with level 3 rated charger 204, operating at around 400V-900V and about 50 kW to 350 kW, which can correspond to about 55 A to 875 A of current range.

Chargers 204 can be set or configured to operate at a maximum power, voltage or current level that is offset from the set charger capacity 250. For example, a charger 204 can be configured to operate at an offset power below that is a particular amount of power below the charger capacity 250, such as for example, 20% of the maximum charger capacity 250 below the charger capacity 250. For example, a charger 204 having a charger capacity 250 set at 2 kW can have its maximum operating power set at about 1.6 kW, which is about 20% of the charger capacity 250 power below the charger capacity 250. Likewise, the offset from the charger capacity 250 can be set at 10% below the charger capacity 250 (e.g., 1.8 kW) or any other offset amount. Chargers 204 can communicate the rated levels (e.g., charger capacities 250) via network interfaces 206, such as via a network 101 and with the DPS 230 or panel 210.

Network interface 206 can include any combination of hardware and software for communicating via a network 101. Network interface 206 can include scripts, functions and computer code stored in memory and executed or operating on one or more processors (e.g., 610) to implement any network interfacing, such as network communication via a network 101. Network 101 can include any wired or wireless network, a world wide web, a local area network, a wide area network, a Wi-Fi network, a Bluetooth network or any other communication network or platform. Network interface 206 can include functionality for communicating, via network 101, using any network communication protocol such as Transmission Control Protocol (TCP)/Internet Protocol (IP), user datagram protocol (UDP), or any other communication protocol used for communicating over a network 101. Network interface 206 can include communication ports and hardware for receiving and sending data and messages over the network 101 or via a power cable 160. Network interface 206 can include the functionality to encode and decode, send and receive any information, commands, instructions, data structures, values or other data between the EV 105 and CS 204.

Power controller 208 can include any combination of hardware and software for controlling or managing charge or amount of power provided to EV 105. Power controller 208 can include scripts, functions and computer code stored in memory and executed or operating on one or more processors to implement any functionality of the power controller 208. Power controller 208 can include a digital signal processor (DSP), a microcontroller or one or more integrated circuits programmed to implement the controller 208 functionality. Power controller 208 can set, control or monitor a rate of charge to provide to EV 105 or draw from an EV 105. Power controller 208 can set or monitor a power level, a voltage level or a current level for a charge event. Power controller 208 can utilize charger profiles 252 from the DPS 230 to provide a set amount of power throughput (e.g., in either direction) which can be implemented in accordance with settings 234 of the site configuration 232.

Power controller 208 can maintain power input or output, to or from the charger 204, in accordance with the charger profiles 252, thereby implementing the settings 234 (e.g., site operating policies) for the site 202, as dictated by the configuration 232 or representation 236. For example, power controller 208 can operate a charger 204 in accordance with particular policies or rules, that can include or be derived, determined or established based on settings 234. Power controller 208 can utilize a charger profile 252 to set the operating power level of the charger 204, such as a maximum charger capacity 250 when the configuration 232 dictates so, or at a power level that is lower than the maximum charger capacity (e.g., in accordance with the configuration 232 and/or settings 234).

Power controller 208 can be deployed on a charger 204 or on a panel 210. For example, power controller 208 on a panel 210 can user phase mapping information to manage electrical load delivered to the chargers 204 using different power lines 212, 214, 214 operating at different phases 312, 314 and 316. For example, chargers 204 can be configured to receive maximum current available, such that the sum of the sum of the maximum currents from each of the chargers 204 can exceed the panel capacity 218 for a phase at the panel. In such instances, the power controller 208 at the panel 210 can monitor the number of chargers 204 connected to the particular power line (e.g., phase line) as well as the amount of power that they are drawing in order to throttle the amount of power delivered via those power line to prevent the breaker 222 for the particular power line (e.g., phase line) from being tripped.

Panel 210 can include any electrical panel for interfacing chargers 204 with electrical grid. Panel 210 can include circuitry, wiring, circuit breakers 222 and power lines, such as the first power line 212, second power line 214 and third power line 216. Each power line 212, 214 and 216 can operate at its own phase. Panel 210 can provide receive and provide power to the electrical grid using three phases via power lines 212, 214 and 216. Panel 210 can be configured (e.g., via circuitry and/or electronics) to provide power to chargers 204 and receive power from chargers 204. Panel 210 can be connected to the electrical grid on one side and to any number of chargers 204 on the other. Multiple chargers 204 can be electrically coupled with the same one or more phases of the panel 210 (e.g., phases at power lines 212, 214 and/or 216).

Panel capacity 218 can include any maximum operating capacity of the panel 210. Panel capacity 218 can include a power, current or voltage limitation of the panel 210, at any power level, such as power levels sufficient to accommodate multiple (e.g., 2, 4, 8, 10 or more) simultaneously operating level 1, level 2 and level 3 chargers 204. Panel capacity 218 can include voltage, current or power threshold for the panel 210 at which breakers 222 can be tripped. For example, panel capacity 218 can include maximum power capacity of a single power line (e.g., 212, 214 or 216). A power capacity of a single power line (e.g., a phase line) such as power/phase line 212, 214 or 216 can sometimes be referred to as a phase line capacity 218.

Panel capacity 218 can include, establish or provide a maximum power capacity of one or more power lines (e.g., phase lines) such as any combination of three power lines at the panel. Panel capacity 218 can include a maximum capacity of the phase lines, such as the maximum power capacity of each one of the first power line 212, the second power line 214 and the third power line 216. For example, the first power line 212 and the second power line 214 can include a power capacity of 100 A at anywhere between 110 and 220V. Breakers 222 can be configured to trip when the power capacity of the power lines 212 and 214 are exceeded, therefore limiting the charger 204 operation at a power range that is below the panel capacity 218. Panel 210 can include multiple panel capacities 218, such as panel capacities for any combination of power lines 212, 214 and 216, including for example a panel capacity 218 for first and second power lines 212 and 214 and another panel capacity 218 for first and third power lines 212 and 216. The panel capacities 218 for any power lines 212, 214 and/or 216 can be same or different from each other, depending on the configuration. Panel capacities 218 can be configured such that breakers 222 are tripped when the power (e.g., voltage and current) are exceeded.

Breakers 222 can include any circuit breakers, contactors or other devices for protecting panel 210 or its circuitry from overcurrent or short circuits. Breakers 222 can be distributed at various points of the panel 210. For example, a breaker 222 can be applied to any of the first, second or third power lines 212, 214, 216, with respect to the ground of the panel 210. The ground of the panel 210 can be shared or coupled with the ground lines of the chargers 204. Accordingly, a breaker 222 can be installed on a first power line 212 and a ground, second power line 214 and the ground and/or third power line 216 and the ground. A breaker 222 can be installed on all three phases (e.g., power lines 212, 214 and 216) and the ground to cap the maximum power throughput at a three-phase level.

Power lines 212, 214 and 216 can sometimes be referred to as the phase lines 212, 214 and 216 as each one of them can operate at its own phase 312, 314 or 316. For example, power line 212 operating at a phase 312 can be referred to as a phase line 212. Likewise, power line 214 operating at a phase 314 can be referred to as a phase line 214 and power line 216 operating at a phase 316 can be referred to as a phase line 216.

Data processing system (DPS) 230 can include any combination of hardware and software for providing or establishing a configuration 232 and/or settings 234 for a site 202, one or more chargers 204 and/or a panel 210. DPS 230 can include processors 510 processing instructions stored in memories, such as main memory 515, ROM 520 or storage device 525, to implement actions or functionalities of the DPS 230. DPS 230 can receive, via network 101, data, from any number of EVs 105. DPS 230 can utilize validation functions 246 to implement site configurations 232, and utilize display functions 248 to provide representations 236 of the site configurations 232. DPS 230 can provide user interface 240 to the users. DPS 230 can include and/or implement power controller 208 along with charger profiles 252 that can be established based on settings 234 in order to implement the particular site configuration 232. DPS 230 can implement its functionality using instructions stored in a memory, such as main memory 515, ROM 520 or storage device 525 and implemented using processors (e.g., processor 510).

DPS 230 can include functions operating on a server or any other network device, a cloud or any other service, such as a software as a service platform. DPS 230 can include a cloud-based service or a service provided by one or more servers. DPS 230 can be accessible to user devices, such as smartphones or computers, which the users can utilize to access site configurations 232 and display representations 236 via user interfaces 240, using the display function 248. DPS 230 can provide validation function 246, via which the user can validate, establish or set a configuration 232. DPS 230 can include or use a profile generator 238 to generate charger profiles 252 to implement the set, established or validated configuration 232 in accordance with the settings 234 and/or inputs 242.

DPS 230 can include a computing system or a device that is located at the site 202 and that is communicatively connected to the panel 210. For example, DPS 230 can be a device that is integrated with, attached to, coupled with or included in the panel 210. For example, DPS 230 can be a device that is connected to the panel 210 via a wiring or a wireless connection. DPS 230 can communicate with the panel 210 and the chargers 204 via a wired or a wireless network 101 or a local area network located or established at the charging site 202. For example, a panel 219 can be connected to, or include a computing device (e.g., a DPS 230) that includes a display device with the user interface 240. The operator of the site 202 can go to the panel 210 and use the DPS 230 on the panel 210 to update the power or phase mapping, adjust the settings 234 (e.g., policies) or reconfigure any aspect of the configuration 232 using the user interface.

Chargers 204 can include a default setting for chargers 204 in the event in which the communication with the DPS 230 is unavailable. For example, when a DPS 230 is off line or unavailable for longer than a predetermined time duration (e.g., 5, 10 or 15 minutes) chargers 204 can resort to a setting 234 that is conservative in terms of the amount power at which chargers 204 operate. For example, chargers 204 can determine that a time period without any communication with a DPS 230 exceeds a predetermined threshold. In response to this determination, chargers 204 can resort to a default or backup charger profile 252 by which chargers 204 can have their power throughput capped at a power level at which the sum of all power throughputs from all chargers 204 at the site 202 does not exceed the panel capacity 218 of the panel 210.

Site configuration 232 can include any configuration or a setup for power distribution of chargers 204 with respect to a panel 210 at a site 202. Site configuration 232 can include a setup or a configuration by which chargers 204 operate at particular power levels. The power levels of operation of the chargers 204 can be at charger capacities 250, an offset (e.g., 10% or 20%) below the charger capacity 250 or at any other power level below the charger capacity 250. Site configuration 232 can include a configuration of power, voltage or current levels of each of the chargers 204. Site configuration 232 can include a setup or configuration of power lines 212, 214 or 216 to which each of the chargers 204 is connected. For example, site configuration 232 can include a setup by which a first charger 204 is connected to a first power line 212 and a second charger 204 is connected to the same first line 212 or a different power line (e.g., lines 214 or 216). Configuration 232 can define the connections of the chargers 204 such that multiple chargers 204 at a site 202 are connected to a same line 212 or different lines 212, 214 and 216.

Settings 234 can include any settings, configurations, policies or rules for configuring chargers 204 at a site 202. Settings 234 can include a policy or a set of rules in accordance with which chargers 204 operate at set power levels. Settings 234 can include policies or rules for managing power output from chargers 204 to ensure that panel capacity 218 is not exceeded, while providing chargers 204 with maximum amount of power to operate within the confines of the panel capacity 218 limitation.

Settings 234 can include a policy or a set of rules for powering EVs at a site 202 in accordance with first in first out (FIFO) order. For example, a FIFO setting 234 can prioritize those chargers 204 that were activated earliest over those that began to be used (e.g., are activated) at a later time. For example, in a FIFO setting 234, a first charger 204 that was activated by a user an hour ago is given precedence in terms of power output over a second charger 204 that was activated by another user 30 minutes ago. In a FIFO setting 234, if there is a surplus power to be provided to the first and second chargers 204 to allow one of those chargers to operate at charger capacity 250, the charger 204 that was activated first (e.g., the first charger 204) would be given the maximum amount of power, up to its charger capacity 250, while the second charger 204 would get whatever power is left over up to the panel capacity 218.

Settings 234 can include a policy or a set of rules for powering EVs at a site 202 in accordance with an equal share of power for all chargers. For example, an equal share setting 234 can distribute power across chargers 204 such that the power distribution is substantially equally distributed. For example, in an equal share setting 234, a first charger 204 can be provided a set amount of power, voltage or current and a second charger 204 can be provided with a substantially same amount of power. For example, the difference between the power amounts provided to the two chargers can differ by about up to 1%, 2%, 5%, 10%, 15% or 20%. In an equal share setting 234, any surplus power to be provided to the chargers 204 can be provided equally (e.g., substantially equally) across all the available chargers 204. For instance, each charger 204 can receive a charger policy 252 in accordance with which the chargers 204 operate at the same power levels across the site 202.

Representation 236 can include any representation of the configuration 232. Representation 236 can include a representation that can be generated by a display function 248 to provide, illustrate or display a site configuration 232 to the user. Representation 236 can be generated by a display function 248 and can include a layout or a map of a site 202 along with any chargers 204 connected to any power lines 212, 214 or 216. Representation 236 can illustrate, depict or reflect any settings 234 user inputs 242 or outputs 244. Representation 236 can be provided via a user interface 240. Representation 236 can include a site level view of the site 202 along with all the chargers 204 and panels 210 at the site.

For example, representation 236 can include a representation of 3-phase electrical panel. Representation 236 can include a representation of breaker switches 222 on the panel 210 to which each charger 204 is connected. Representation 236 can include an indication of an assignment of chargers to show the physical wiring of the chargers 204 to the phase lines of the panel 210. The representation 236 can include a visualization of all chargers 204 that are connected to a particular phase line.

User interface 240 can include any user interface for displaying, illustrating or mapping a representation 236 of a configuration 232 to user. User interface 240 can receive user inputs 242 and provide outputs 244. Inputs 242 can include any inputs or selections from a user configuring or validating the configuration 232. For example, input 242 can include policy selections (e.g., settings 234 selections) that can be provided by the user. Input 242 can include breakers 222 selections or configurations. Input 242 can include charger 204 selections, inputs or configurations. User interface 240 can provide a site level view of the site 202. The site level view can illustrate, depict or map all of the chargers 204 and panels 210 at a site, along with their electrical interconnections, panel capacities 218, charger capacities 250 and charger profiles 252.

Outputs 244 can include any outputs of the user interface 240 and/or the representation 236 of the configuration 232 to the user. Outputs 244 can include a map or layout of the site 202. Outputs 244 can include a graphical representation of connection between the chargers 204 and the power lines 212, 214 or 216, as well as representation of any particular breakers 222 to which the chargers 204 are connected. Outputs 244 can include power, current or voltage levels (e.g., capacities) of the panel 210 (e.g., panel capacity 218) or charger 204 (e.g., charger capacity 250).

Validation function 246 can include any function of the representation and/or the user interface 240 by which a user can validate a representation 236 and/or the configuration 232. Validation function 246 can include a function for utilizing inputs 242 and/or settings 234 selected or input by the user to configure or setup the configuration 232. Validation function 246 can allow for user inputs 242 to generate charger profiles 252.

Validation function 246 can operate with a profile generator 238 to determine the charger profiles 252. In some instances, validation function 246 can determine that a configuration 232 is invalid. For example, the validation function 246 can identify an error in the configuration 232, such as an incorrect breaker 222 connected to a power line 212, 214 or 216. Validation function 246 can provide an output 244 to the user suggesting a modification. The user can provide an input 242 or a modified setting 234, upon which the validation function 246 can reevaluate the configuration 232.

Profile generator 238 can include any combination of hardware and software for generating charger profiles 252. Profile generator 238 can generate charger profiles 252 based on or using any combination of site configuration 232, settings 234, inputs 242 and outputs 244. Profile generator 238 can generate charger profiles 252 in accordance with settings 234 and/or in order to implement the configuration 232 per settings 234. Profile generator 238 can generate charger profiles 252 to implement a FIFO settings 234 or equal share settings 234. Profile generator 238 can generate charger profiles to prefer a particular make and/or model of EVs 105 over other make and/or model of EVs 105.

Charger profiles 252 can include any combination of instructions, rules or settings for a particular charger 204 in order to implement a configuration 232. Charger profiles 252 can be same or different for any chargers 204. Charger profiles can be generated based on or in accordance with settings 234, inputs 242 and/or outputs 244. Charger profiles 252 can be generated in response to a validation by a user via a validation function 246. Charger profiles 252 can be generated in response to a change in the number of EV chargers being used or active. For example, a charger profile 252 can be provided by the DPS in response to detecting that a charger 204 has been activated or connected to an EV 105. Charger profile 252 can determine, limit or set a current, a voltage and/or power level or range for a charger. Charger profile 252 can include any information about the charger 204, such as the make and model of the charger 204, serial number of the charger 204, network address or identifier of the charger 204, data on how the charger 204 is connected to the panel 210 (e.g., via which lines 212, 214 or 216) as well as in accordance with which power/voltage/current limitations.

Display function 248 can include any display function for displaying representation 236 to the user. Display function 248 can generate the mapping, illustration or depiction of the site 202 along with chargers 204, and any electrical connections between the chargers 204 and the panel 210. Display function 248 can illustrate or depict representations 236 of the configuration 232 along with any settings 234, inputs 242 or outputs 244.

The solution can include a representation 236 of a configuration 232 for load management of chargers 204 at a site 202 which can be displayed to user using a user interface 240. Representation 236 can include inputs 242 and settings 234 that a user can provide or select as well as power lines (e.g., 212, 214 and 216), each one of which can correspond to its own individual phase (e.g., first phase 312, second phase 314 and third phase 316). Breakers 222 can be disposed or located between the electrical conductors connecting each of the chargers 204 and each of the power lines (e.g., 212, 214 or 216) allowing each of the chargers 204 to operate at one or more of a first phase 312, second phase 314 and/or third phase 316. Each charger 204 can include its own charger profile 252. Charger profile 252 can include any information about the charger 204, such as the charger serial or model information or charger 204 identifier on the network.

The representation 236 can allow the user to select settings 234 (e.g., policies) by which chargers 204 can operate, such as the FIFO setting 234, equal share setting 234 or any other setting 234. For example, representation 236 can receive user inputs or selections for configuring or validating the configuration 232. DPS 230 can receive inputs 242, such as power, current or voltage limitations for the charger 204, selection of breakers 222 for chargers 204 or selections power lines (e.g., 212, 214 or 216) to which each of the chargers 204 can be connected. Using the user inputs or selections, the DPS 230 can allow the user to configure, reconfigure or design the connections between the chargers 204 and various power lines 212, 214 and/or 216 in the panel 210.

Representation 236 can include information relating to the panel capacity 218 and charger capacities 250. Representation 236 can include outputs 244, which can be generated in accordance with or based on inputs 242 or settings 234. Representation 236 can depict, illustrate or provide configuration 232 of the site 202 in accordance with charger profiles 252 as derived, determined or established based or, or according to, settings 234 and/or inputs 242.

The present solution can include a system (e.g., system 200) for load management of chargers 204 at a charging site 202. The system 200 can utilize one or more processors (e.g., 610) coupled with memory (e.g., 615, 620 or 625). The one or more processors 510 can be configured (e.g., using the instructions stored in the memory 515, 520 or 525) to identify a configuration 232. The configuration 232 can indicate a plurality of chargers 204 coupled with a first line 212 of an electrical panel 210 to conduct power at a first phase 312 and a second line 214 of the electrical panel 210 to conduct power at a second phase 314 different than the first phase 312. The two phases 312 and 314 can be two phases of a three-phase power or electricity provided to the panel 210. The configuration 232 can indicate a power capacity 218 of the electrical panel 210. The one or more processors 510 can be configured to provide, for display via a graphical user interface 240, a representation 236 of the configuration 232. The one or more processors 510 can be configured to validate, responsive to an input (e.g., 242 or 234), the representation 236 of the configuration 232 to cause a power controller 208 to deliver power to a charger 204 of the plurality of chargers 204 via the first line and the second line based on the power capacity of the electrical panel.

Charger 204 configured by the DPS 230 can be connected to one, two or three power lines 212, 214 or 216, each one operating at its own phase (e.g., 312, 314 or 316) and as well as to a ground of the panel 210. Charger 204 can utilize power electronics 165 controlled by the power controller 208 in accordance with charger profile 252. Charger profile 252 of the charger 204 can be generated or established by the DPS 230 based on, or in accordance with, the site configuration 232.

Figure 3:
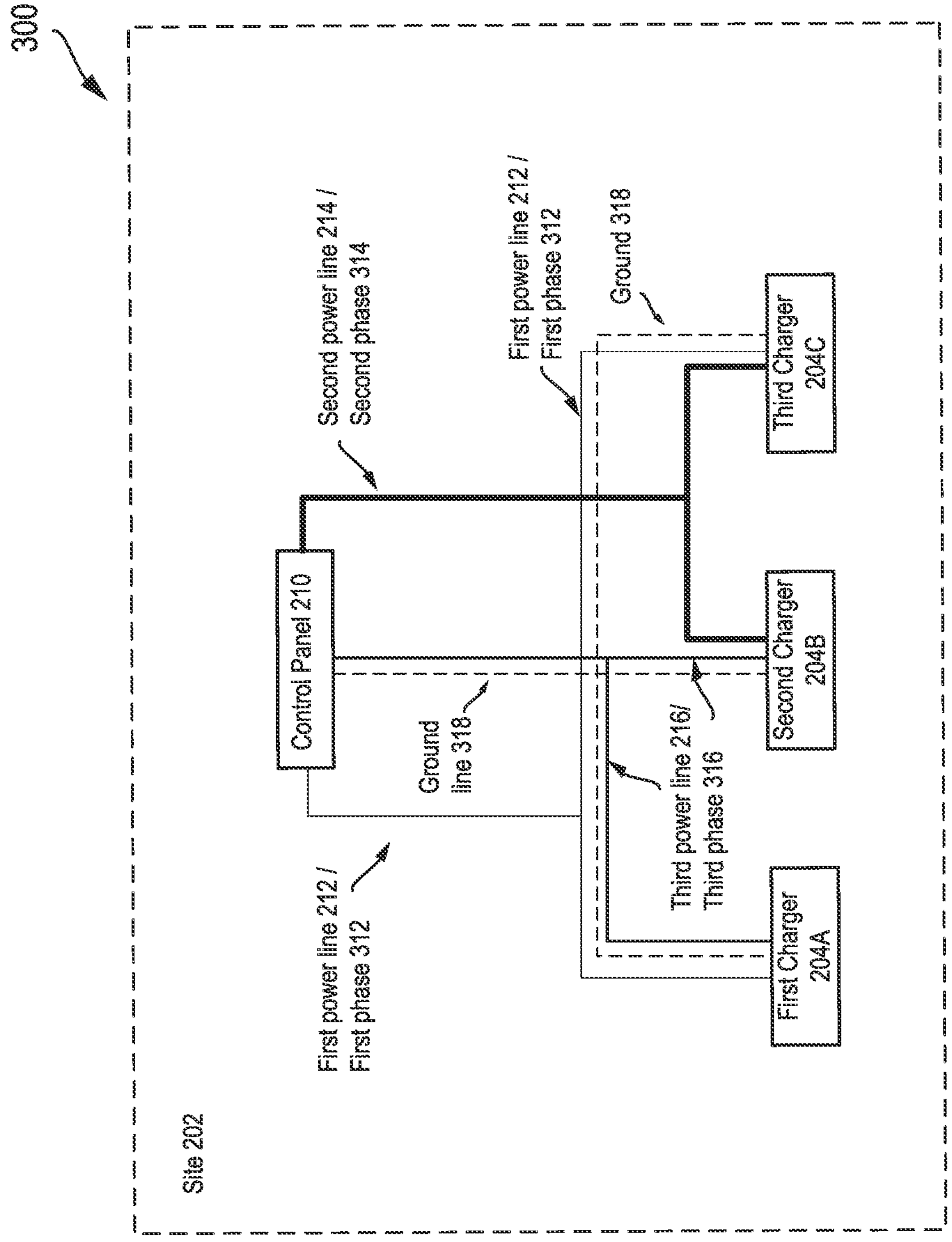
FIG. 3 depicts an example of a configuration of EV chargers at a site in accordance with an embodiment of the present solution.

FIG. 3 illustrates an example 300 of a wiring configuration of chargers 204 at a site 202. The wiring of EV chargers 204 can couple chargers 204 to particular phase lines 212, 214 or 216 of the electrical panel 210. Site 202 can include, for example, three chargers 204, including a first charger 204A, a second charger 204B and a third charger 204C. Each of the three chargers 204A-C can be electrically coupled to the control panel 210. Control panel 210 can provide to each charger 204A, 204B and 204C a ground line 318 as well as two power lines (e.g., 212, 214 and 216). Each of the power lines can operate at its own phase of electricity (e.g., 312, 314 and 316).

First charger 204A can be coupled with the control panel 210 via a first power line 212 operating at a first phase 312, a third power line 216 operating at a third phase 316 and a ground line 318. Second charger 204B can be coupled with the control panel 210 via a second power line 214 operating at a second phase 314, a third power line 216 operating at a third phase 316 and a ground line 318. Third charger 204C can be coupled with the control panel 210 via a first power line 212 operating at a first phase 312, a second power line 214 operating at a second phase 314 and a ground line 318.

Ground line 318 can be a same ground line for the control panel 210 and each of the chargers 204A-C. Ground line 318 can be a line of the control panel 210 that is connected to the ground. Ground line 318 can be a common line, such as a floating line of the control panel 210. Each charger 204A-C can operate on two out of three phases of the control panel 210 with respect to the ground line 318.

The present solution can include a system (e.g., a combination of a system 200 and system 300) for phase balanced load management of chargers 204 at a charging site 202. The system 200 or 30 can utilize a data processing system 230 implemented with one or more processors (e.g., 510) coupled with memory (e.g., 515, 520 or 525). The system 200 or 300 can include a DPS 230 coupled with or within a charger 204, electrical panel 210 or a remote server or a cloud-based (e.g., software as a service) application. A processor 510 can identify a setting 234 for a first charger 204 and for a second charger 204. The processor 510 can identify the setting 234 that was selected by a user via a user interface 240. The first charger 204A and the second charger 204B can be coupled with a phase line (e.g., 212, 214 or 216) of an electrical panel 210 to conduct power at a first phase (e.g., 312, 314 or 316). For example, processor 510 can identify a setting 234 for a first charger 204A and a second charger 204B, where the first charger 204A and the second charger 204B are coupled with the control panel 210 via a phase line 216. The settings 234 can be a FIFO setting or a policy for the chargers 204, an equal power sharing setting or a policy for the chargers 204, a policy or a setting for giving preference to particular vehicles types (e.g., vehicles of a particular manufacturer). The first charger 204A and the second charger 204B can be coupled with the control panel 210 via a ground line 318.

The processor 510 can determine that the phase line (e.g., 212, 214 or 216) is configured to operate below a phase line capacity (e.g., panel capacity 218 of the phase line 212, 214 or 216) while the first charger 204 coupled with the phase line (e.g., 212, 214 or 216) operates at a charger capacity 250 of the first charger 204. For example, the processor 510 can determine that phase line 216 is configured to operate below a phase line capacity 218 of the phase line 216 while the first charger 204A coupled with the phase line 216 operates at a charger capacity 250 of the first charger 204A. The processor 510 can determine that the phase line 216 is configured to operate below the phase line capacity (e.g., panel capacity 218 of the phase line 212, 214 or 216) while the first charger 204A coupled with the phase line 216 operates a charger capacity 250 of the first charger 204A and while the second charger 204B also coupled with the phase line 216 operates at a charger capacity 250 of the second charger 204B.

The processor 510 can cause the first charger 204 to operate at the charger capacity 250 according to the setting 234 in response to determining that the phase line (e.g., 212, 214 or 216) is configured to operate below the phase line capacity 218 while the first charger 204 coupled with the phase line (e.g., 212, 214 or 216) operates at the charger capacity 250. For example, the processor 510 can cause the first charger 204A to operate at the charger capacity 250 of the first charger 204A according to the setting 234 in response to determining that the phase line 216 is configured to operate below the phase line capacity (e.g., panel capacity 218 of the phase line 212, 214 or 216) while the first charger 204A coupled with the phase line (e.g., 212, 214 or 216)

operates at the charger capacity 250. Processor 510 can cause the first charger 204A to operate at its charger capacity 250 according to the setting and in response to determining that the phase line 216 is configured to operate below the phase line capacity 218 of the phase line 216 while both the first charger 204A and the second charger 204B, coupled with the phase line 216, operate at their charger capacities 250.

Processor 510 can detect activation of the first charger 204 by a user of an electric vehicle 105. For example, the processor 510 on the charger 204 can detect activation of the first charger 204, based on for example, detecting that the charger 204 is plugged into an EV 105. Processor 510 can cause, in response to the detection of the activation of the first charger 204, the first charger 204 to conduct power via a cable 160 attached to the electric vehicle 105 according to an offset corresponding to the charger capacity 250. For example, the offset to the charger capacity 250 can be a power level that is a set percentage below the power capacity 250, such as a power level that is at about 80% of the power capacity 250. For example, if a power capacity is 15 kW, the offset can be 20% of the 15 kW (e.g., 3 kW) so that the power delivered to the EV 105 can be set by the charger 204 at about 20% below the 15 kW (e.g., 12 kW). The offset of the charger capacity 250 can be any fraction or percentage of the power capacity 250, such up to 5%, 10%, 15%, 20% or 25%.

The system 200 can include the first charger 204 and the second charger 204 that are coupled with a ground line 318 and with a second phase line (e.g., 212, 214 or 216) of the electrical panel 210 to conduct power at a second phase (e.g., 312, 314 or 316) different than the first phase (e.g., remaining of the 312, 314 or 316). For example, the first charger 204A and the second charger 204B can each be coupled with the control panel 210 via a ground line 318 as well as another phase line (e.g., in addition to phase line 216), such as phase line 212 or 214. For example, in addition to being coupled with the control pane 210 via a phase line 216 and a ground 318, the first charger 204A can also be coupled with the control panel 210 via a phase line 212. For example, in addition to being coupled with the control pane 210 via a phase line 216 and a ground 318, the second charger 204B can also be coupled with the control panel 210 via a phase line 214.

Processor 510 can cause the second charger 204 to operate at a second charger capacity 250 of the second charger 204 according to the setting 234 and in response to determining that the second phase line (e.g., 212, 214 or 216) is configured to operate below a second phase line capacity 218 of the second phase line (e.g., 212, 214 or 216) while the second charger 204 coupled with the second phase line (e.g., 212, 214 or 216) operates at the second charger capacity 250. For example, processor 510 can cause charger 204B to operate a charger capacity 250 of the charger 204B according to the setting 234 in response to determining that the second phase line 214 is configured to operate below the panel capacity 218 of the second phase line 214, while the charger 204B coupled with the phase line 214 operates at the second charger capacity 250.

The processor 510 can determine the phase line (e.g., 216) is configured to operate at a power level that is below the phase line capacity (e.g., panel capacity 218 for the phase line 216) when the second charger 204B and the first charger 204A operate at their charger capacities 250 simultaneously from the phase line (e.g., 216). In response to this determination, the processor 510 can cause the second charger 204 to operate at the second charger capacity 250 of the second charger 204. In response to this determination, the processor 510 can cause the first charger to operate at the first charger capacity 250 of the first charger 204.

The processor 510 can cause the first charger 204 and the second charger 204 to operate at a substantially equal amount of power. For example, the first charger 204A and the second charger 204B can operate at power levels that are within 5%, 10%, 15% or 20% within each other in terms of their respective power outputs. The first charger 204A and the second charger 204B can be included in a plurality of chargers 204 coupled with the phase line (e.g., 216) and comprising a sum of power capacities 250 of the plurality of chargers 204 that exceed the phase line capacity (e.g., the panel capacity 218 of the phase line 216).

The processor 510 can detect the second charger 204 activated subsequent to activation of the first charger 204. The processor 510 can cause the second charger 204 to operate at a second amount of power. The processor 510 can detect the second charger 204 activated subsequent to activation of the first charger 204 in accordance with the setting 234 and in accordance with the phase line capacity (e.g., panel capacity 218 of the phase line 212, 214 or 216). For example, the second amount of power for the second charger 204B can be a different amount of power than the amount of power for the first charger 204A. The second amount of power can be less than an amount of power at which the first charger 204 operates at the charger capacity 250.

The processor 510 can detect the second charger 204 activated subsequent to activation of the first charger 204. The processor 510 can cause the first charger 204 and the second charger 204 to operate at a substantially equal amount of power (e.g., within 5%, 10%, 15% or 20% of power level of each other) in accordance with the setting 234 and in accordance with the phase line capacity (e.g., panel capacity 218 of the phase line 212, 214 or 216 to which the second charger 204 is coupled). For example, the processor 510 can cause the first charger 204A to operate at a power level that is within 10% of the power level at which the second charger 204B operates, in accordance with the setting 234 (e.g., setting selected by a user) and in accordance with the panel capacity 218 of the phase line 216 to which first charger 204A and second charger 204B are coupled.

The processor 510 identify the setting 234 for a third charger 204 and for a fourth charger 204, the third charger 204 and the fourth charger 204 coupled with a third phase line (e.g., 212, 214 or 216) of the electrical panel 210 to conduct power at a third phase (e.g., 312, 314 or 316). The processor 510 can determine that the third phase line (e.g., 212, 214 or 216) is configured to operate below a third phase line capacity of the third phase line 212, 214 or 216 (e.g., panel capacity 218 of the third phase line 212, 214 or 216) while the third charger 204 coupled with the third phase line (e.g., 212, 214 or 216) operates at a third charger capacity 250 of the third charger 204. The processor 510 can cause the third charger 204 to operate at the third charger capacity 250 according to the setting 234 in response to determining that the third phase line is configured to operate below the third phase line capacity (e.g., panel capacity 218 of the third phase line 212, 214 or 216) while the third charger 204 coupled with the third phase line operates at the third charger capacity 250.

The processor 510 can cause power to be delivered to a subset of a plurality of chargers 204 coupled with the phase line (e.g., 212, 214 or 216) in accordance with an individual capacity 250 of each charger of the subset of the plurality of chargers 204. The subset can include the first charger 204A and the second charger 204B. For example, a sum of the individual capacities 250 of the subset of the plurality of charger 204 does not exceed the phase line capacity (e.g., panel capacity 218 of the phase line 212, 214 or 216). For example, a sum of individual capacities 250 of the plurality of chargers 204 can exceed the phase line capacity (e.g., panel capacity of the phase line 212, 214 or 216).

The processor 510 can identify a subset of the plurality of chargers 204. The subset of the plurality of chargers 204 can include the first charger 204 and the second charger 204. Each charger 204 of the subset of the plurality of chargers 204 can have an individual power capacity 250 and can exchange power with an electric vehicle 105. A sum of the individual power capacities 250 of the subset of the plurality of chargers 204 can exceed the phase line capacity (e.g., panel capacity of the phase line 212, 214 or 216). The processor 510 can cause power to be delivered equally to each charger 204 of the subset of the plurality of chargers 204 in accordance with the setting 234 and in accordance with an offset from the phase line capacity 250. For example, the processor 510 can generate and provide charger profiles 252 to the chargers 204 to control power output from the chargers 204. The offset from the phase line capacity 250 can be an offset to reduce the power output by about 5%, 10%, 15% or 20% from the power level at the power capacity 250.

In some aspects, the present solution relates to a non-transitory computer-readable media having processor readable instructions. The instructions can be such that, when executed, cause a processor 510 to identify a setting 234 for a first charger 204 and for a second charger 204. The first charger 204 and the second charger 204 can be coupled with a phase line (e.g., 212, 214 or 216) of an electrical panel 210 to conduct power at a first phase (e.g., 312, 314 or 316). The setting 234 can include a setting or a policy, such as FIFO policy, an equal power sharing policy or a policy to give priority or preference to vehicles of a particular type or manufacturer.

The instructions can be configured to cause the processor 510 to determine that the phase line (e.g., 212, 214 or 216) is configured to operate below a phase line capacity (e.g., panel capacity 218 of the phase line 212, 214 or 216) while the first charger 204 coupled with the phase line (e.g., 212, 214 or 216) operates at a charger capacity 250 of the first charger 204. For example, the instructions can cause the processor 510 to determine that the phase line 216 coupled with the first charger 204A and second charger 204B will remain below a panel capacity 218 of the phase line 216 when the first charger 204 operates at the charger capacity 250 of the first charger 204. The instructions can cause the processor 510 to determine that the phase line 216 coupled with the first charger 204A and second charger 204B will remain below a panel capacity 218 of the phase line 216 when the first charger 204 operates at the charger capacity 250 of the first charger 204 and the second charger 204B operates at the charger capacity 250 of the second charger 204. The charger capacities of the first and the second chargers 204 can be substantially the same (e.g., within 5% or 10% from each other).

The instructions can be configured to cause the first charger 204 to operate at the charger capacity 250 according to the setting 234 in response to determining that the phase line 212, 214 or 215 is configured to operate below the phase line capacity (e.g., panel capacity 218 of the phase line 212, 214 or 216) while the first charger 204 coupled with the phase line 212, 214 or 216 operates at the charger capacity 250. For example, the instructions can cause the processor 510 to cause the first charger 204A to operate at the charger capacity 250 of the first charger 204A according to the setting 234 in response to determining that the phase line 216 is configured to operate below the phase line capacity (e.g., panel capacity 218 of the phase line 212, 214 or 216) while the first charger 204A coupled with the phase line (e.g., 212, 214 or 216) operates at the charger capacity 250. The instructions can be configured to cause the first charger 204A to operate at its charger capacity 250 according to the setting and in response to determining that the phase line 216 is configured to operate below the phase line capacity 218 of the phase line 216 while both the first charger 204A and the second charger 204B, coupled with the phase line 216, operate at their charger capacities 250.

The instructions can be configured to cause the processor 510 to detect activation of the first charger 204 by a user of an electric vehicle 105. For example, the user of the electric vehicle 105 can activate the charger 204 by using the charger 204 and in response to the usage the processor 510 can detect activation of the charger 204. The instructions can cause, in response to the detection, the first charger 204 to conduct power via a cable 160 attached to the electric vehicle 105 according to an offset corresponding to the charger capacity 250. For example, the offset to the charger capacity 250 can be a power level that is a set percentage below the power capacity 250, such as for example a power level that is at 80% of the power capacity. For example, if a power capacity is 15 kW, the offset can be 20% of the 15 kW (e.g., 3 kW) so that the power delivered to the EV 105 can be set by the charger 204 at about 20% below the 15 kW (e.g., 12 kW). The offset of the charger capacity 250 can be any fraction or percentage of the power capacity 250, such up to 5%, 10%, 15%, 20% or 25%.

Figure 4:
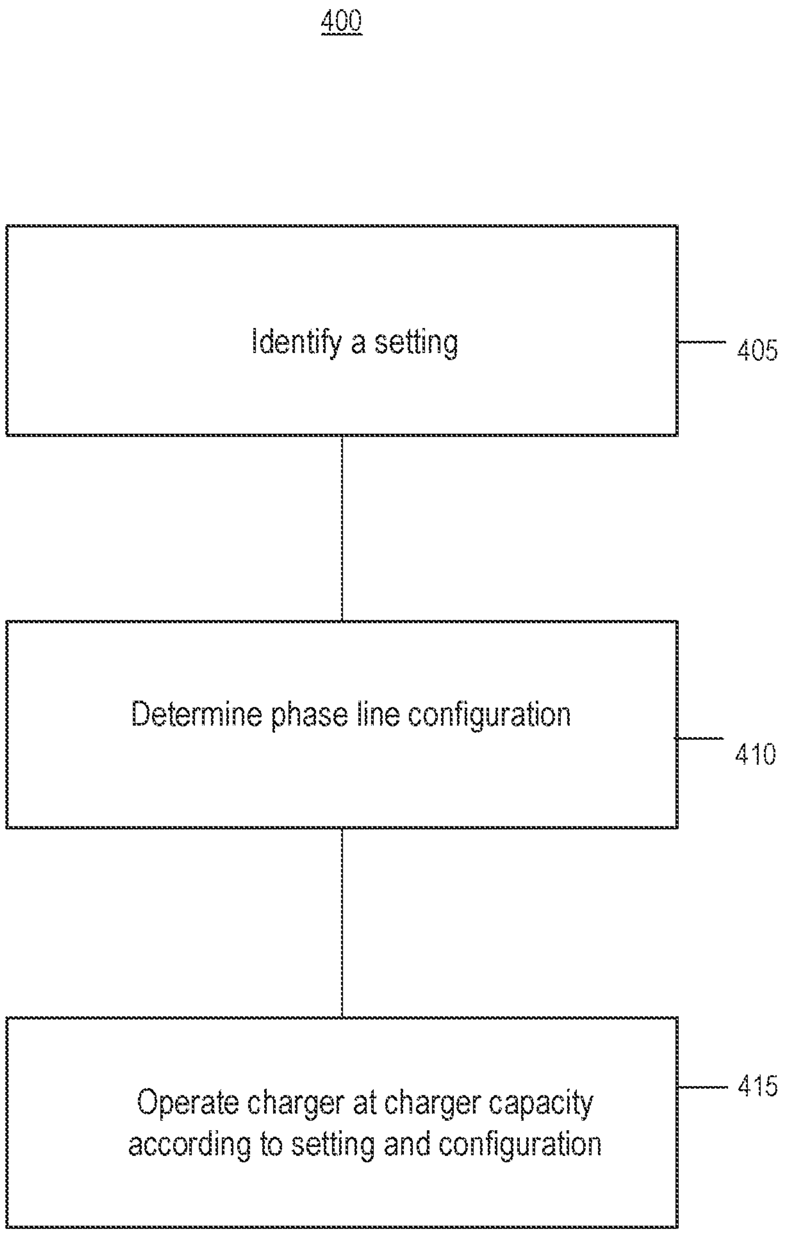
FIG. 4 is a flow diagram illustrating an example method for providing phase based load management of chargers at an EV charging site.

FIG. 4 illustrates a method 400 for a data processing system (DPS) to perform phase balance load management of chargers 204 utilizing the system 200 depicted in FIGS. 2 and 3. The DPS can perform load management two operate chargers 204 attached to a panel 210 at a site 202. The method can include ACTS 405-415. At ACT 405, one or more processors can identify a setting. At ACT 410, the one or more processors can determine a phase line configuration. At ACT 415, the one or more processors can operate a charger at a charger capacity according to a setting and the configuration.

At ACT 405, one or more processors can identify a setting. The method can include one or more processors coupled with a memory identifying a setting for a first charger and for a second charger. The one or more processors can include any combination of one or more processors of a data processing system, a charger or an electrical panel. The one or more processors can identify a setting for a plurality of chargers at the site. The one or more processors can be included or coupled with any one or more of a data processing system, a charger or an electrical panel.

The plurality of chargers can include the first charger and the second charger. The first charger and the second charger can be coupled with a phase line of an electrical panel to conduct power at a first phase. The first charger and the second charger can be coupled to a same or a different second phase line. The first and the second charger can be coupled with a ground line, such as a ground line of the electrical panel. In addition to being coupled with the first phase line, the first charger can be coupled with a second phase line coupled with the electrical panel and the second charger can be coupled with a third phase line coupled with the electrical panel. The one or more processors can identify the setting for a third charger and for a fourth charger. The third charger and the fourth charger can be coupled with a third phase line of the electrical panel to conduct power at a third phase.

The one or more processors can identify the setting including a policy or one or more rules. The one or more processors can identify the setting of the site configuration that is selected by a user or an operator to configure the operation of the chargers on the site. The setting can include a first in first out (FIFO) setting or a policy to provide power at the charger power capacity (e.g., maximum power output of the charger) to the charger that is first activated and to provide a maximum amount of available power to the second charger activated subsequently (e.g., whatever power is left over) and up to the power capacity of the second charger. The FIFO setting can provide a maximum remaining power to the third charger after the first two chargers have been powered or operated at their maximum power capacity. The setting can include an equal power sharing policy in which each charger is limited to a same amount of power output, up to the maximum power capacity. The setting can include a vehicle type policy in which priority is given to vehicles of a particular type (e.g., particular make or model), such that priority vehicles have their chargers set up at maximum power capacity while power capacities powering other vehicles are given a lower priority and have their power levels set to whatever left over power capacity is left (e.g., in terms of panel capacity 218).

The one or more processors can detect activation of the first charger by a user of an electric vehicle. For example, the one or more processors can detect that a user has approached, grabbed or used a power cable of the charger. A charger can detect that a power cable is used, handled or attached to an electric vehicle in response to a signal from the power cable indicating that the power cable is used, handled or plugged into an electric vehicle. The one or more processors of the charger can generate an indication for the one or more processors of the data processing system indicating that the first charger is activated.

In response to the detection of the activation of the first charger, the one or more processors can cause the first charger to conduct power via the cable attached to the electric vehicle according to a power capacity or an offset corresponding to the charger capacity. For example, the first charger can provide power at an offset power amount reduced from the charger capacity. The offset can correspond to up to 5%, 10%, 15%, 20% or 25% of the power capacity of the charger.

The one or more processors can detect the second charger activated subsequent to activation of the first charger. For example, the one or more processors can receive a signal or an indication, after detecting that the first charger is activated at the site, that a second charger is activated at the site. The second charger can be activated a time period after the activation of the first charger. After activation of the first charger, followed by activation of the second charger, the first and the second charger can both be operating simultaneously. For example, after detecting that the first and the second chargers have been activated the one or more processors can receive a signal or an indication, that a third charger has been activated at the site. The first, the second and the third chargers can each operate simultaneously.

The one or more processors can identify a subset of the plurality of chargers. The subset can include the first charger and the second charger. The subset can include the first, the second and the third charger. Each charger of the subset can have an individual power capacity. Each charger of the subset can exchange power with an electric vehicle. Each charger of the subset can have power capacities such that a sum of the individual power capacities of the each charger of the subset exceeds the phase line capacity. The phase line capacity can be a panel capacity with respect to a particular phase line (e.g., of the three phase lines in the electrical panel). The phase line capacity can be, for example 16 A, 32 A, 50 A, 70 A, 100 A, 200 A or more than 200 A.

At ACT 410, the one or more processors can determine a phase line configuration. The method can include the one or more processors determining that the phase line is configured to operate below a phase line capacity of the phase line while the first charger coupled with the phase line operates at a charger capacity of the first charger. For example, the one or more processors can determine that the phase line to which the first and the second chargers are coupled is going to operate below a panel capacity for that phase line (e.g., below a current level for the phase line) if the first charger operates at the charger capacity of the charger. The operation at the charger capacity can include operation at the charger capacity offset by an amount of power amount determined in accordance with the configuration of the charger.

The one or more processors can determine that the panel capacity corresponding to the phase line corresponds to a power level that is higher than the sum of the power levels corresponding to the power capacities of the first charger and the second charger. The sum of the power levels can include power capacities of the first charger and the second charger reduced by an offset. The offset can include up to 10% or up to 20% of the power level corresponding to the power capacities. The power capacities of the first charger and the second charger can be substantially the same (e.g., within 5% or 10% of each other) or can be different from each other.

The one or more processors can determine that the third phase line is configured to operate below a third phase line capacity (e.g., panel capacity of the third phase line) while the third charger coupled with the third phase line operates at a third charger capacity of the third charger. For example, the third phase line can be a phase line coupled with one of the first charger or the second charger. For example, the one or more processors can determine that the panel capacity corresponding to the phase line, the second phase line and the third phase line will remain below the panel capacity for the first, second and the third phase lines if the first charger operates at its power capacity. The first charger can operate at the power level corresponding to the power capacity that is reduced by the offset (e.g., up to 10% or 20% of the charger capacity power level).

For example, the one or more processors can determine that the panel capacity corresponding to the phase line, the second phase line and the third phase line will remain below the panel capacity for the first, second and the third phase lines if the first charger and the second charger both operate at their power capacities. The first charger and the second charger can each operate at the power levels corresponding to the power capacities that are reduced by the offset (e.g., up to 10% or 20% of the charger capacity power level).

For example, the one or more processors can determine that the panel capacity corresponding to the phase line, the second phase line and the third phase line will remain below the panel capacity for the first, second and the third phase lines if the first charger and the second charger both operate at their power capacities. The first charger and the second charger can each operate at the power levels corresponding to the power capacities that are reduced by the offset (e.g., up to 10% or 20% of the charger capacity power level).

For example, the one or more processors can determine that the panel capacity corresponding to the phase line, the second phase line and the third phase line will remain below the panel capacity for the first, second and the third phase lines if the first charger, the second charger and the third charger each operate at their power capacities. The first charger, the second charger and the third charger can each operate at the power levels corresponding to their corresponding power capacities that are reduced by the offset (e.g., up to 10% or 20% of the charger capacity power level).

At ACT 415, the one or more processors can operate a charger at a charger capacity according to a setting and the configuration. The method can include the one or more processors causing the first charger to operate at the charger capacity according to the setting in response to determining that the phase line is configured to operate below the phase line capacity while the first charger coupled with the phase line operates at the charger capacity. For example, the data processing system can generate a profile for the charger, which the power controller of the charger can use to operate the charger in accordance with the profile. For example, the data processing system can update the profile of the charger (e.g., via instructions or commands) to set the operation levels (e.g., power levels) of the first charger.

The one or more processors can cause the first charger (e.g., as well as the second or third chargers) to operate in accordance with FIFO setting. The one or more processors can cause the first charger (e.g., as well as the second or third chargers) to operate in accordance with the equal power sharing setting. The one or more processors can cause the first charger (e.g., as well as the second or third chargers) to operate in accordance with the setting prioritizing electric vehicles by a specific manufacturer (e.g., make or model). The one or more processors can cause the first charger to operate in accordance with any setting or rule.

The one or more processors can cause the first charger to operate at the charger capacity of the first charger that is reduced by an offset and according to the setting. The one or more processors can cause the first charger to operate in response to determining that the phase line to which the first charger is coupled, is configured to operate below the panel capacity of the phase line while the first charger operates at the charger capacity of the first charger reduced by the offset. The one or more processors can cause the first charger to operate in response to determining that the phase line to which the first charger and the second charger are both coupled, is configured to operate below the panel capacity of the phase line while both the first charger and the second charger operate at their individual charger capacities reduced by their individual offsets (e.g., up to 10% or 20% of the charger capacity).

The one or more processors can cause the second charger to operate at a second charger capacity of the second charger according to the setting and in response to determining that the second phase line is configured to operate below a second phase line capacity of the second phase line while the second charger coupled with the second phase line operates at the second charger capacity. The second charger can operate at the same power level as the first charger. The second charger can operate at a lower power level than the first charger. The second charger can operate at a higher power level than the first charger.

The one or more processors can cause the first charger and the second charger to operate at a substantially equal amount of power. The first charger and the second charger can be included in a plurality of chargers coupled with the phase line, where a sum of power capacities of the plurality of chargers exceeds the phase line capacity. The one or more processors can cause the second charger to operate at a second amount of power in accordance with the setting and in accordance with the line capacity. The second amount of power can be less than an amount of power at which the first charger operates at the charger capacity. The second amount of power of the second charger can be substantially the same (e.g., within 5% or 10%) as the amount of power at which the first charger operates.

The one or more processors can cause the first charger and the second charger to operate at a substantially equal amount of power in accordance with the setting and in accordance with the phase line capacity. The one or more processors can cause the third charger to operate at the third charger capacity according to the setting in response to determining that the third phase line is configured to operate below the third phase line capacity while the third charger coupled with the third phase line operates at the third charger capacity.

The one or more processors can cause power to be delivered to a subset of a plurality of chargers coupled with the phase line in accordance with an individual capacity of each charger of the subset of the plurality of chargers. The subset can include the first charger and the second charger, where a sum of the individual capacities of the subset does not exceed the phase line capacity and a sum of individual capacities of the plurality of chargers exceeds the phase line capacity. The one or more processors can cause power to be delivered equally to each charger of the subset in accordance with the setting and in accordance with an offset from the phase line capacity.

Figure 5:
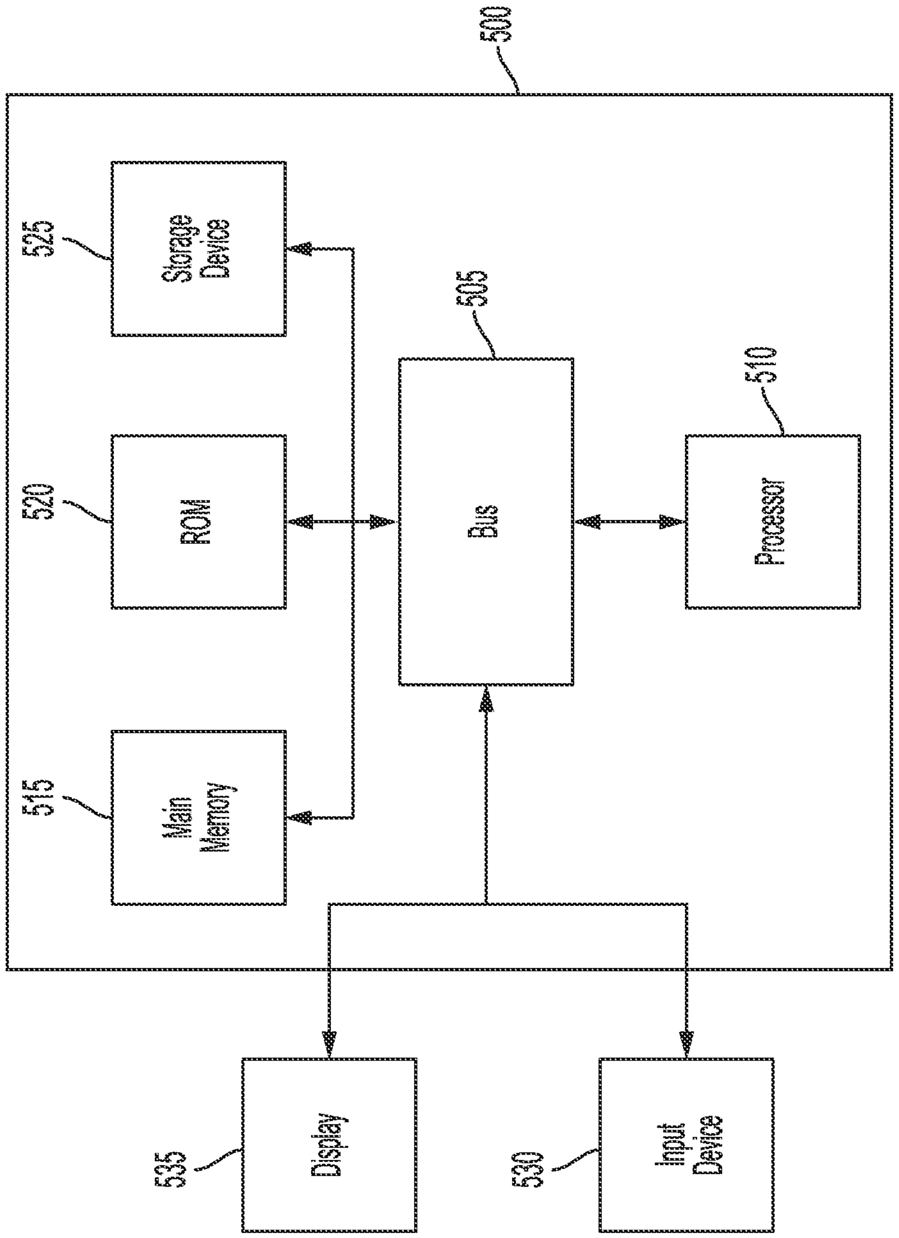
FIG. 5 is a block diagram illustrating an architecture for a computer system that can be employed to implement elements of the systems and methods described and illustrated herein.

FIG. 5 depicts an example block diagram of an example computer system 500. The computer system or computing device 500 can include or be used to implement a data processing system or its components. The computing system 500 includes at least one bus 505 or other communication component for communicating information and at least one processor 510 or processing circuit coupled to the bus 505 for processing information. The computing system 500 can also include one or more processors 510 or processing circuits coupled to the bus for processing information. The computing system 500 also includes at least one main memory 515, such as a random access memory (RAM) or other dynamic storage device, coupled to the bus 505 for storing information, and instructions to be executed by the processor 510. The main memory 515 can be used for storing information during execution of instructions by the processor 510. The computing system 500 may further include at least one read only memory (ROM) 520 or other static storage device coupled to the bus 505 for storing static information and instructions for the processor 510. A storage device 525, such as a solid state device, magnetic disk or optical disk, can be coupled to the bus 505 to persistently store information and instructions.

The computing system 500 may be coupled via the bus 505 to a display 535, such as a liquid crystal display, or active matrix display, for displaying information to a user such as a driver of the electric vehicle 105 or other end user. An input device 530, such as a keyboard or voice interface may be coupled to the bus 505 for communicating information and commands to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP. PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, a positive or a negative terminal of a battery, or power direction when an electric vehicle is charged or discharged. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:

one or more processors coupled with memory to:

identify a setting for a first charger and a second charger, the first charger and the second charger coupled with a phase line of an electrical panel to conduct power at a first phase;

determine that a total amount of power to be drawn by the first charger and the second charger, from the phase line and while the first charger operates at a charger capacity of the first charger, is less than a capacity of the phase line; and provide one or more inputs to a controller to cause the first charger to provide power at the charger capacity according to the setting responsive to determination that the total amount of power is less than the capacity of the phase line while the first charger operates at the charger capacity.

2. The system of claim 1, comprising the one or more processors to:

detect activation of the first charger by a user of an electric vehicle; and cause, in response to detection of the activation of the first charger, the first charger to conduct power via a cable attached to the electric vehicle according to the charger capacity.

3. The system of claim 1, wherein the first charger and the second charger are coupled with a ground line and with a second phase line of the electrical panel to conduct power at a second phase different than the first phase, and comprising the one or more processors to:

cause the second charger to operate at a charger capacity of the second charger according to the setting and in response to determination that the second phase line is configured to operate below a capacity of the second phase line while the second charger operates at the charger capacity of the second charger.

4. The system of claim 1, comprising:

the first charger and the second charger comprised by a plurality of chargers coupled with the phase line and comprising a sum of power capacities of the plurality of chargers exceeding the capacity of the phase line.

5. The system of claim 1, comprising the one or more processors to:

detect the second charger activated subsequent to activation of the first charger; and cause the second charger to operate, in accordance with the setting and in accordance with the capacity of the phase line, at a second amount of power, the second amount of power less than an amount of power at which the first charger operates at the charger capacity of the first charger.

6. The system of claim 1, comprising the one or more processors to:

detect the second charger activated subsequent to activation of the first charger; and cause the first charger and the second charger to operate in accordance with the setting and in accordance with the capacity of the phase line.

7. The system of claim 1, comprising the one or more processors to:

identify a setting for a third charger and a fourth charger, the third charger and the fourth charger coupled with a second phase line of the electrical panel to conduct power at a second phase;

determine that the second phase line is configured to operate below a capacity of the second phase line while the third charger operates at a charger capacity of the third charger; and cause the third charger to operate at the charger capacity of the third charger according to the setting for the third charger and the fourth charger in response to determination that the second phase line is configured to operate below the capacity of the second phase line while the third charger operates at the charger capacity of the third charger.

8. The system of claim 1, comprising the one or more processors to:

cause power to be delivered to a subset of chargers of a plurality of chargers coupled with the phase line in accordance with an individual capacity of each charger of the subset of chargers, the subset of chargers comprising the first charger and the second charger, wherein a sum of capacities of the subset of chargers does not exceed the capacity of the phase line and a sum of individual capacities of the plurality of chargers exceeds the capacity of the phase line.

9. The system of claim 1, comprising the one or more processors to:

identify a subset of chargers of a plurality of chargers, the subset of chargers comprising the first charger and the second charger, each charger of the subset of chargers having an individual power capacity and exchanging power with an electric vehicle, wherein a sum of individual power capacities of the subset of chargers exceeds the phase line capacity of the phase line; and cause power to be delivered equally to each charger of the subset of chargers in accordance with the setting.

10. A method, comprising:

identifying, by one or more processors coupled with memory, a setting for a first charger and a second charger, the first charger and the second charger coupled with a phase line of an electrical panel to conduct power at a first phase;

determining, by the one or more processors, that a total amount of power to be drawn by the first charger and the second charger, from the phase line and while the first charger operates at a charger capacity of the first charger, is less than a capacity of the phase line; and providing, by the one or more processors, one or more inputs to a controller to cause the first charger to provide power at the charger capacity according to the setting responsive to determining that the total amount of power is less than the capacity of the phase line while the first charger operates at the charger capacity.

11. The method of claim 10, comprising:

causing, by the one or more processors, the second charger to operate at a charger capacity of the second charger according to the setting and in response to determining that a second phase line is configured to operate below a capacity of the second phase line while the second charger operates at the charger capacity of the second charger.

12. The method of claim 10, wherein:

the first charger and the second charger are comprised of a plurality of chargers coupled with the phase line and a sum of power capacities of the plurality of chargers exceeding the capacity of the phase line.

13. The method of claim 10, comprising:

detecting, by the one or more processors, the second charger activated subsequent to activation of the first charger; and causing, by the one or more processors, the second charger to operate, in accordance with the setting and in accordance with the capacity of the phase line, at a second amount of power, the second amount of power less than an amount of power at which the first charger operates at the charger capacity of the first charger.

14. The method of claim 10, comprising:

detecting, by the one or more processors, the second charger activated subsequent to activation of the first charger; and causing, by the one or more processors, the first charger and the second charger to operate in accordance with the setting and in accordance with the capacity of the phase line.

15. The method of claim 10, comprising:

identifying, by the one or more processors, a setting for a third charger and a fourth charger, the third charger and the fourth charger coupled with a second phase line of the electrical panel to conduct power at a second phase;

determining, by the one or more processors, that the second phase line is configured to operate below a capacity of the second phase line while the third charger operates at a charger capacity of the third charger; and causing, by the one or more processors, the third charger to operate at the charger capacity of the third charger according to the setting for the third charger and the fourth charger in response to determining that the second phase line is configured to operate below the capacity of the second phase line while the third charger operates at the third charger capacity for the third charger.

16. The method of claim 10, comprising:

causing, by the one or more processors, power to be delivered to a subset of chargers of a plurality of chargers coupled with the phase line in accordance with an individual capacity of each charger of the subset of chargers, the subset of chargers comprising the first charger and the second charger, wherein a sum of capacities of the subset of chargers does not exceed the capacity of the phase line and a sum of individual capacities of the plurality of chargers exceeds the capacity of the phase line.

17. The method of claim 10, comprising:

identifying, by the one or more processors, a subset of chargers of a plurality of chargers, the subset of chargers comprising the first charger and the second charger, each charger of the subset of chargers having an individual power capacity and exchanging power with an electric vehicle, wherein a sum of individual power capacities of the subset of chargers exceeds the capacity of the phase line; and causing, by the one or more processors, power to be delivered equally to each charger of the subset of chargers in accordance with the setting.

18. A non-transitory computer-readable media having processor readable instructions, such that, when executed, cause a processor to:

identify a setting for a first charger and a second charger, the first charger and the second charger coupled with a phase line of an electrical panel to conduct power at a first phase;

determine that a total amount of power to be drawn by the first charger and the second charger, from the phase line and while the first charger operates at a charger capacity of the first charger, is less than a capacity of the phase line; and provide one or more inputs to a controller to cause the first charger to provide power at the charger capacity according to the setting responsive to determination that the total amount of power is less than the capacity of phase line while the first charger operates at the charger capacity.

19. The non-transitory computer-readable media of claim 18, wherein the processor is configured to:

detect activation of the first charger by a user of an electric vehicle; and cause, in response to detection of the first charger, the first charger to conduct power via a cable attached to the electric vehicle according to the charger capacity.

20. The system of claim 1, comprising the one or more processors to:

responsive to a detection that the total amount of power is within a predetermined threshold of the capacity of the phase line:

adjust a first amount of power that is allocated to the first charger based at least on an activation time of the first charger; and adjust a second amount of power that is allocated to the second charger based at least on an activation time of the second charger.

* * * * *